Sept. 6, 1938.   F. R. BICHOWSKY   2,129,299
RECOVERY OF SOLVENTS FROM GASES
Filed March 30, 1935
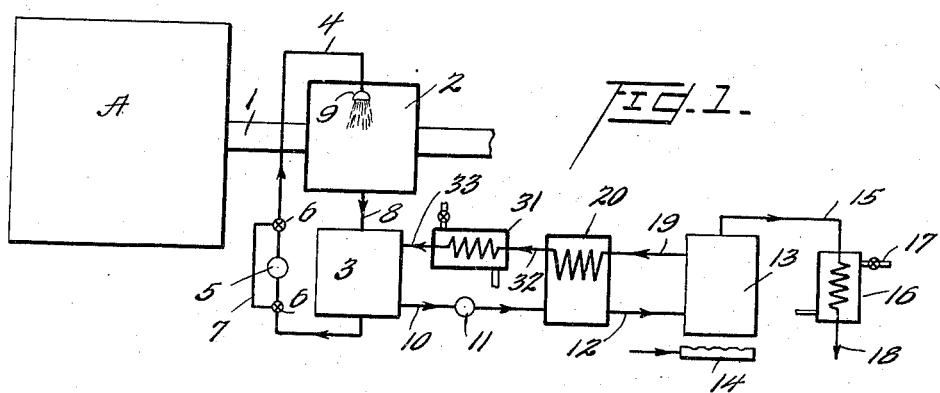
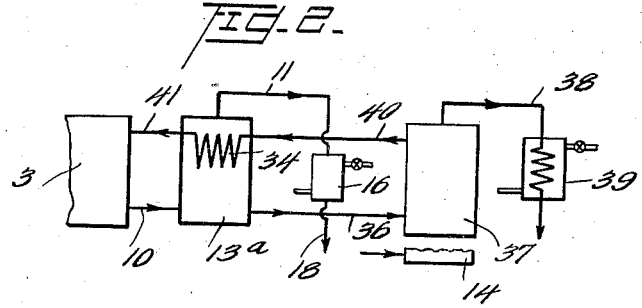
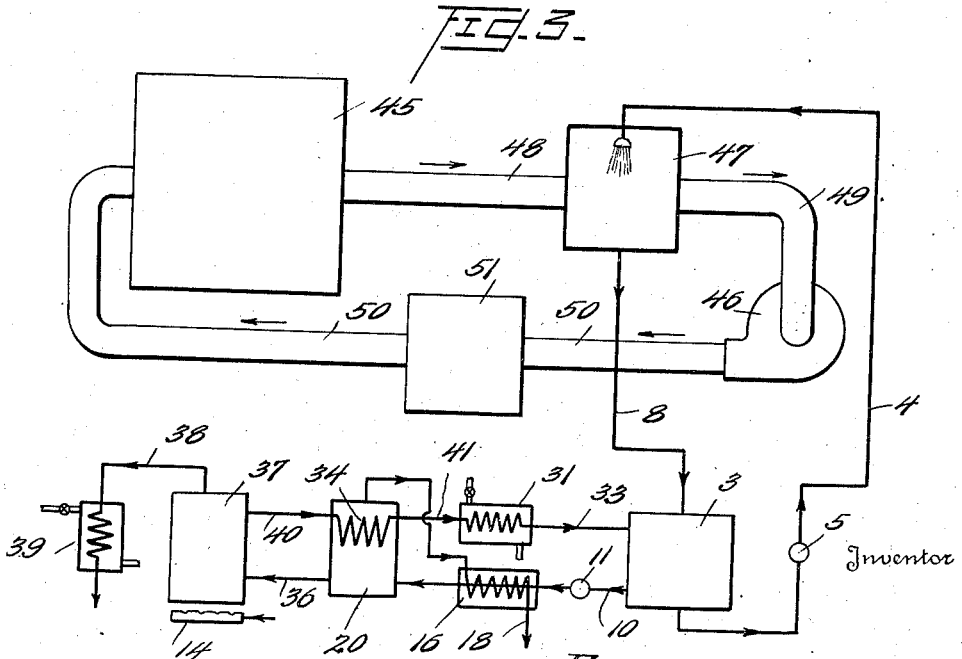
Inventor
Francis R. Bichowsky,
By Earle D. Hammond
Attorney Patented Sept. 6, 1938

2,129,299

UNITED STATES PATENT OFFICE 2,129,299

RECOVERY OF SOLVENTS FROM GASES

Francis R. Bichowsky, Toledo, Ohio, assignor to The Dow Chemical Company, Midland, Mich., a corporation of Michigan Application March 30, 1935, Serial No. 13,967

2 Claims. (Cl. 252—4)

This invention relates to an improved process of recovering non-aqueous vapors and volatile constituents from air or gases throughout which such vapors are diffused.

I have discovered, and this forms the basis of the present invention, that non-aqueous vapors are readily absorbed in aqueous solutions of certain lithium salts and, further, that such vapors may be readily recovered from such solutions in substantially anhydrous form. Thus I have discovered that aqueous solutions of lithium chloride and of other halides of lithium, except the fluoride which is only slightly water soluble, and of other extremely water soluble salts, such as lithium rodanate and lithium nitrate, have an especial power to absorb from air and other gases the vapors of alcohol, acetone, ammonia, hydrogen sulphide, sulphur dioxide and other volatile substances of this type.

According to the present invention, the vapors to be recovered are brought into intimate contact with said solution as by being sprayed with the same. The air or other gas in which the vapors are diffused will lose to the solution or gain from the solution an amount of moisture limited by the concentration of the solution. If the contact between the gas and the solution is sufficiently thorough, all or most of the vapors of the solvents such as alcohols, acetone, ethers, organic acids and the like, will be absorbed in the lithium salt solution and thereby removed from the air, which latter will be thus rendered suitable for re-use or which may be discarded. These volatile constituents absorbed in the lithium salt solutions may be recovered in any of the ways customarily used for recovering the volatile constituents from aqueous solutions. I have discovered that they can be easily and completely recovered in a substantially anhydrous form, suitable for re-use by heating the solution of lithium salt containing them, either in a current of air or in a vacuum or to a temperature depending on the concentration of the lithium salt and on the type of solvent, so that they will distill off at atmospheric or other pressures. It is one of the distinct advantages of my process that by controlling the concentration of the lithium salt in the aqueous solution, I am able to control, within certain limits, the degree of dryness of the recovered solvent. By using very concentrated solutions, I find it possible to obtain substantially anhydrous solvents. I presume that the reason why it is possible to recover volatile constituents in a substantially anhydrous form by the practice of this process is that the partial pressure of aqueous vapor over a concentrated solution of lithium salts is lower than the partial pressure of water over solutions of the substances in water. After the volatile constituent is recovered, the concentrated solution of lithium salt may be used again to recover further volatile constituents in a continuous cycle of operation or otherwise.

Having described my process in a general manner, I will now refer in detail to one embodiment of the process as illustrated in Fig. 1. In this figure, A may be taken as indicating a drying chamber wherein volatiles are given off by material being dried; I a conduit for conducting the vapor or volatile laden air to a spray chamber 2, and 3 a tank or sump containing a lithium salt solution with an affinity for the volatile constituent desired to be recovered in the spray chamber 2. 4 represents a pipe by which the solution may be conveyed to a spray head 9 in the chamber 2, where it is contacted with air or other gases containing the volatile constituent which it is desired to recover. In order to convey the solution from the sump 3 to the chamber 2, a pump 5 may be provided and in order to control the flow of the solution into the chamber 2, the speed of the pump may be controlled by well known means not shown, or by means of valves 6 or by-pass 7. The liquid solution of lithium salt, after having been contacted with air and having absorbed therefrom the portion of the volatile constituent is returned to the sump 3 via the pipe 8, which pipe may be provided with interposed pumps if desired. This provides a controlled connection for continuously circulating the solution from the tank 3 to the chamber 2 where it is diffused in a finely divided stream by the sprayer device 9, to contact the gas and the vapors diffused therein before returning to the tank 3.

In order to maintain the liquid in the sump 3 in an active condition, so that it may be re-used, and in order to recover the valuable volatile constituents in the sump 3, a portion or all of the solution returned from the chamber 2 is conveyed by the pipe 10, the pump 11 and the pipe 12, into an apparatus adapted to recover the volatile constituents from the aqueous solution. This apparatus may consist of a boiler or separator 13, which is heated by a source of heat 14 to such a temperature and at such a pressure that the volatile constituents may be distilled off in the form of vapor via the pipe 15 and may be condensed to liquid in the condenser 16, which is provided with a source of cooling 17. The liquid volatile constituent is collected at 18 and may be used or further purified as desired. After having most or substantially all of the volatile constituents removed by boiling, the aqueous solution is removed from the boiler 13 by the pipe 19. In order to conserve heat and at the same time render it unnecessary to use a large amount of cooling, it is convenient to place the hot liquid leaving the boiler via the path 19 in thermal exchange relation with the cold liquid in a heat exchanger 20. The revivified liquid, after passing the thermal interchanger 20 and having been cooled to a certain degree therein, may be further cooled, if desired, in the cooler 31, which is connected with the interchanger 20 by the pipe 32. The liquid leaving the cooler 31 may be delivered by the pipe 33 again into the sump or tank 3, the connections through the regenerator thus forming a closed circuit. A pump or other propelling means 11 may be provided at any convenient point in this circuit.

In slightly different form the process may be applied to the case where both water and volatile constituents are given off as is the case of drying such preparations as celluloid. In this variation, it is convenient to remove both the volatile constituent which has been absorbed by the solution and to remove the water. It is necessary to remove the water since otherwise it would tend to accumulate in the solution and thus dilute it so that it would lose its efficiency. In order to do this, I may employ the apparatus as shown in Fig. 2, which figure shows an alternate arrangement for part of the apparatus shown in Fig. 1, namely, that part for regenerating the solution and recovering the solvents. As described in connection with Fig. 1, a portion of the liquid in the sump 3 is conveyed via the pipes 10 and 12 to the apparatus in which it is to be revivified. In this form of the process, the apparatus may consist of a boiler 13ª in which the liquid is heated to such a temperature as to drive off substantially all of the volatile constituent and not to remove the water. Because of the high boiling point of the solution in respect to water, it is possible to obtain by the process of this invention nearly complete separation of the more commonly employed volatile constituents without the contamination of water. The boiler 13ª may be heated by any convenient source of heat, or it is practical to employ the hot concentrated liquid from another portion of the process to heat the liquid in the boiler 13ª. In this arrangement, the boiler may be provided with a coil of pipe 34 or other means of transferring heat from hot liquid to the liquid in the boiler. The solvent or water removed by a partial distillation in this boiler may be conveyed via the pipe 11 to the condenser 16 and from there may be conveyed as desired by the pipe 18 in a similar manner to the disclosure in Fig. 1.

The solution of lithium salts now substantially free from volatile constituent or water may be conveyed by the pipe 36 to the boiler 37, where it may be concentrated by boiling, the water or high boiling solvent being removed by the pipe 38 and condensed in the condenser 39, if desired. The hot concentrated solution may be returned by the pipe 40 and serves to heat the liquid in the boiler 13ª by coil 34, as hereinbefore described. The partially cooled liquid may be returned by the pipe 41 and may be further treated and used as described in connection with the apparatus arrangement of Fig. 1.

The process has a further advantage in that the air or gas, which has been treated in the chamber by the solution is in a condition, since it is of a controlled humidity and temperature and degree of purity, to be re-employed in the processing of the materials from which it is desired to recover volatile constituents. In many industrial processes in which solvent vapors are released, it is desirable or necessary to carry out such process in an atmosphere of controlled moisture content, controlled temperature, and controlled composition. For this purpose, it may be desired to use the air or other gas, say for example a gas free from oxygen or enriched in oxygen as the case may be, in a closed cycle so that the gas, after being freed from solvent and brought to the correct temperature and humidity by being contacted with a concentrated solution of lithium salt of controlled concentration and temperature, is returned to the chamber where it is used to dry or cure substances, the gas after having been used for such processes, being returned to the chamber for further treatment.

Figure 3 shows a modified arrangement wherein the space 45 corresponds to space A in Fig. 1 and a fan 46 or other means may be employed to convey the air in a circulating stream from the space 45 through the chamber 47, and back to the space for re-use. Conduits 48, 49 and 50 serve to interconnect the space, and chamber to confine the air or gas stream and define a recirculating path for the air or gas. This air or gas circuit may include therein further conditioning apparatus 51 to cool, heat or chemically treat the air or gas as may be required. The air or gas from the space 45 is conveyed through the chamber 47, which corresponds to the chamber 2 in Fig. 1. In this chamber, it receives a like treatment to that described in connection with the embodiment in Fig. 1. The treatment of the solution and the apparatus for recovering the solvents shown in Fig. 3 are substantially the same as that described in connection with the other modifications, and the operation is substantially the same. The liquid agent from the tank 3 is conveyed through pipe 10, pump 11, condenser 16, into the heat exchanger 20 from which it is carried through boiler 37. After being heated in the boiler to remove vapors the liquid returns to the tank 3 by pipe 40, coil 34, and pipe 41, passing through cooler 31. As in the modified form of structure shown in Fig. 2, and above described, the liquid may be concentrated in the boiler 37 and vapors and solvents may be recovered from the heat exchanger 20 and boiler 37 in the manner previously described. In this modification, the liquid in its circulation to and from the tank 3 passes in heat exchange relationship through the condenser structure 16, as well as through the coil 34 of the heat exchanger. It is contemplated by this modification of the system to apply it to the treatment of materials in the space A, and to recover therefrom, by the recovery method described, by-products and substances which have heretofore been wasted.

The operation of the system will be clearly understood from the foregoing description.

The invention provides an advantageous method of and means for recovering solvents from air and gases, providing at the same time for the re-use of the conditioned air or gas. By controlling the concentrations of the liquid agent, it is possible to obtain recovery of materials with a degree of dryness desired, or anhydrous material may be recovered. The apparatus and method are arranged for continuous operation for continuously treating gases from any source whatever and are especially adapted for use in industrial processes and where heretofore it has been customary to allow the gases to escape to the atmosphere.

I claim:

1. In a method of recovering a volatile solvent from a mixture of carrier gas and vapor of the solvent, the steps which consist in bringing the mixture into contact with a concentrated aqueous solution of a highly water-soluble lithium halide salt, whereby the solution absorbs the vapor of the solvent, treating the solution containing the absorbed solvent vapor to drive off said solvent vapor, and condensing the solvent vapor thus driven off.

2. In a method of recovering a volatile solvent from a mixture of carrier gas and vapor of the solvent, the steps which consist in bringing the mixture into contact with a concentrated aqueous solution of lithium chloride, whereby the solution absorbs the vapor of the solvent, treating the solution containing the absorbed solvent vapor to drive off said solvent vapor, and condensing the solvent vapor thus driven off.

FRANCIS R. BICHOWSKY.